United States Patent
Gordon

(10) Patent No.: US 9,644,425 B2
(45) Date of Patent: May 9, 2017

(54) APPARATUS FOR HANGING OR STORING TOOLS AND EQUIPMENT ON AN EXTENSION LADDER

(71) Applicant: Michael Cory Gordon, Boulder, CO (US)

(72) Inventor: Michael Cory Gordon, Boulder, CO (US)

( * ) Notice: Subject to any disclaimer, the term of this patent is extended or adjusted under 35 U.S.C. 154(b) by 0 days.

(21) Appl. No.: 14/799,106

(22) Filed: Jul. 14, 2015

(65) Prior Publication Data
US 2016/0265279 A1    Sep. 15, 2016

Related U.S. Application Data

(60) Provisional application No. 62/130,630, filed on Mar. 10, 2015.

(51) Int. Cl.
| | |
|---|---|
| *E06C 7/14* | (2006.01) |
| *F16B 2/04* | (2006.01) |
| *F16M 13/02* | (2006.01) |
| *F16B 2/14* | (2006.01) |
| *F16B 13/08* | (2006.01) |
| *F16B 45/00* | (2006.01) |

(52) U.S. Cl.
CPC ............... *E06C 7/143* (2013.01); *F16B 2/04* (2013.01); *F16M 13/022* (2013.01); *F16B 2/14* (2013.01); *F16B 13/0891* (2013.01); *F16B 45/00* (2013.01)

(58) Field of Classification Search
CPC ...... F16M 13/02; F16M 13/022; F16M 13/00; F16M 11/10; F16M 11/041; F16M 11/08; F16M 11/04; F16M 11/2014; F16M 11/24; F16M 11/12; F16M 11/16; F16M 11/22; F16M 11/32; F16M 13/027; F16M 2200/065
USPC ...................... 248/210, 211, 215, 238, 231.9
See application file for complete search history.

(56) References Cited

U.S. PATENT DOCUMENTS

| | | | | |
|---|---|---|---|---|
| 3,987,993 | A * | 10/1976 | Hopkins ................... | E06C 7/14 248/110 |
| 4,025,016 | A * | 5/1977 | Brothers ................... | E06C 7/14 248/210 |
| 5,259,525 | A * | 11/1993 | Wion ....................... | E06C 7/143 220/737 |
| 2013/0140423 | A1* | 6/2013 | Taylor ..................... | E06C 7/143 248/544 |
| 2013/0256481 | A1* | 10/2013 | Saucier ................... | E06C 7/143 248/210 |
| 2014/0263897 | A1* | 9/2014 | Saucier ................... | E06C 7/143 248/210 |

* cited by examiner

*Primary Examiner* — Steven Marsh
(74) *Attorney, Agent, or Firm* — Will Hunziker

(57) ABSTRACT

An apparatus with: a handle, a bolt, a feature for attachment or storage of tools, two or more wedges, and an elastic belt that allow for hanging or storing tools and equipment on an extension ladder such that there is a maximal amount of surface contact and compression between an expanding clamp mechanism and the interior of a ladder rung. The apparatus can be configured in an almost infinite number of ways as desired by the user for length and features for attachment and it uses many off the shelf and easily obtainable components making repair and modification convenient for the user.

16 Claims, 4 Drawing Sheets

APPARATUS FOR HANGING OR STORING TOOLS AND EQUIPMENT ON AN EXTENSION LADDER

CROSS REFERENCE TO RELATED APPLICATIONS

This application claims the benefit of U.S. Provisional Patent Application Ser. No. 62/130,630, filed on Mar. 10, 2015, with the same title, which is incorporated by reference herein in its entirety for all purposes.

BACKGROUND OF THE INVENTION

1. Field of the Invention

The present invention relates generally to extension ladder tool hangers and more specifically it relates to an apparatus that securely inserts into the side of a ladder for hanging or storing tools and equipment.

2. Description of Related Art

About 70% of the industrial metal ladders made today have hollow rungs, or steps, which are attached to the side rails of the ladder leaving a hole that runs through the rung exposed. The benefit of this design is that the ladder has strong and durable rungs and the manufacturer saves money on the metal that would cover the rung holes.

There are several hangers that currently exist for hanging tools from an extension ladder by somehow attach themselves to the rung holes. Of the popular models for sale today is the LadderLimb, which is simply a long tapered rubber rod that jambs into the ladder rungs and stays put by compression of the rubber. Another model is the Hangman, which inserts into one side of a rung and tightens by extending one angled metal lever upwards. Another model is the Warner Paint Can Hook, which is simply a hook that hangs on a rung of the ladder.

The problem with these products is that none of them has a very secure connection with the ladder and over time and use they will likely fall out and need to be re-secured. The present invention solves this problem by using a more secure method of attachment guaranteeing a long and secure attachment of the apparatus with minimal use of space.

SUMMARY

The scope of the present invention is defined solely by the appended claims and detailed description of a preferred embodiment, and is not affected to any degree by the statements within this summary. In addressing many of the problems experienced in the related art, such as those relating to securing a tool holder to the interior of a ladder rung; the present disclosure generally involves an apparatus with: a handle, a bolt, a feature for attachment or storage of tools, two or more wedges, and an elastic belt that allow for hanging or storing tools and equipment on an extension ladder such that there is a maximal amount of surface contact and compression between an expanding clamp mechanism and the interior of a ladder rung. The apparatus can be configured in an almost infinite number of ways as desired by the user for length and features for attachment and it uses many off the shelf and easily obtainable components making repair and modification convenient for the user.

BRIEF DESCRIPTION OF THE DRAWINGS

The above, and other, aspects, features, and advantages of several embodiments of the present disclosure will be more apparent from the following Detailed Description as presented in conjunction with the following several figures of the Drawing.

1. FIGURES

Figure 1:
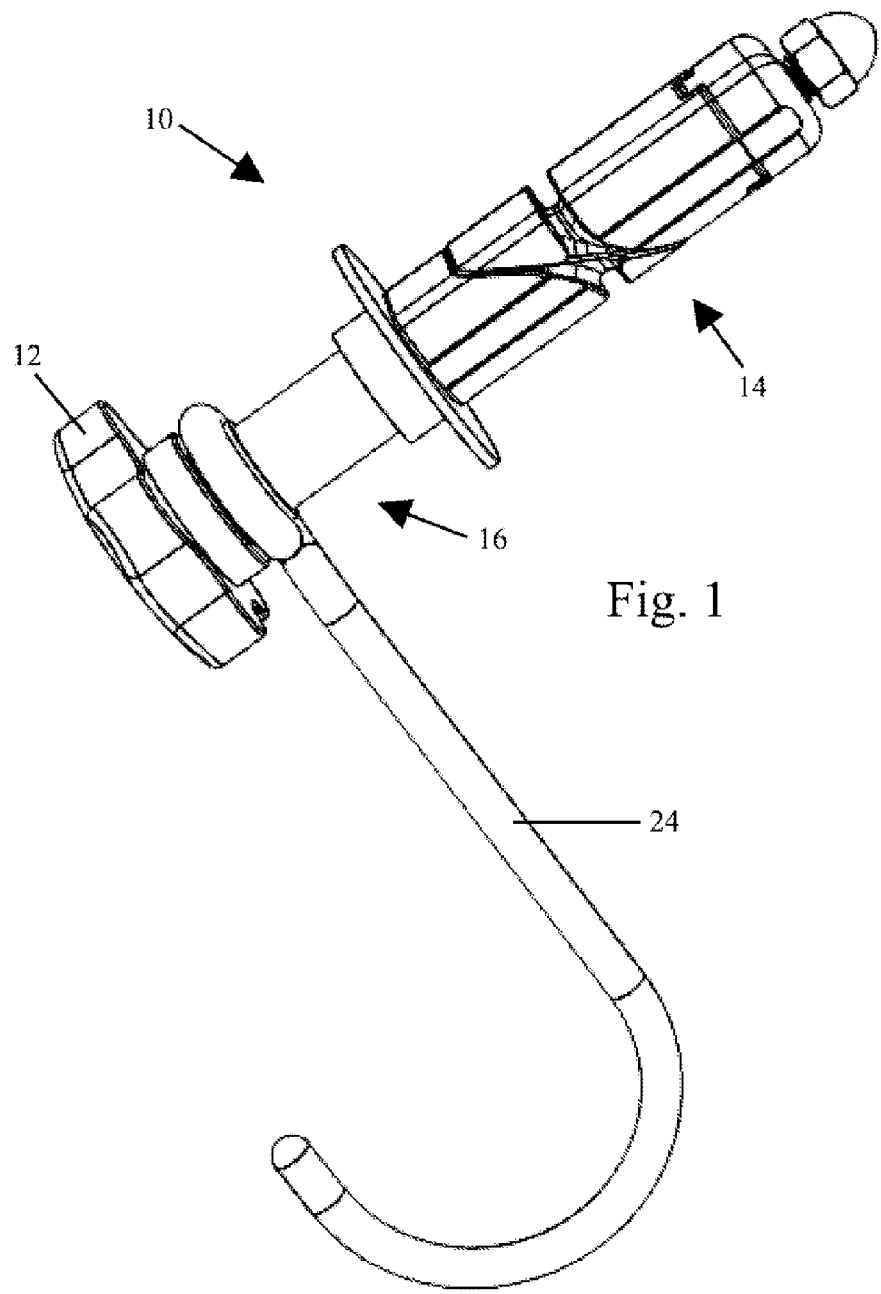

FIG. 1 (Sheet 1) illustrates a side perspective view of an apparatus for hanging or storing tools and equipment on an extension ladder, in accordance with an embodiment of the present disclosure.

Figure 2:
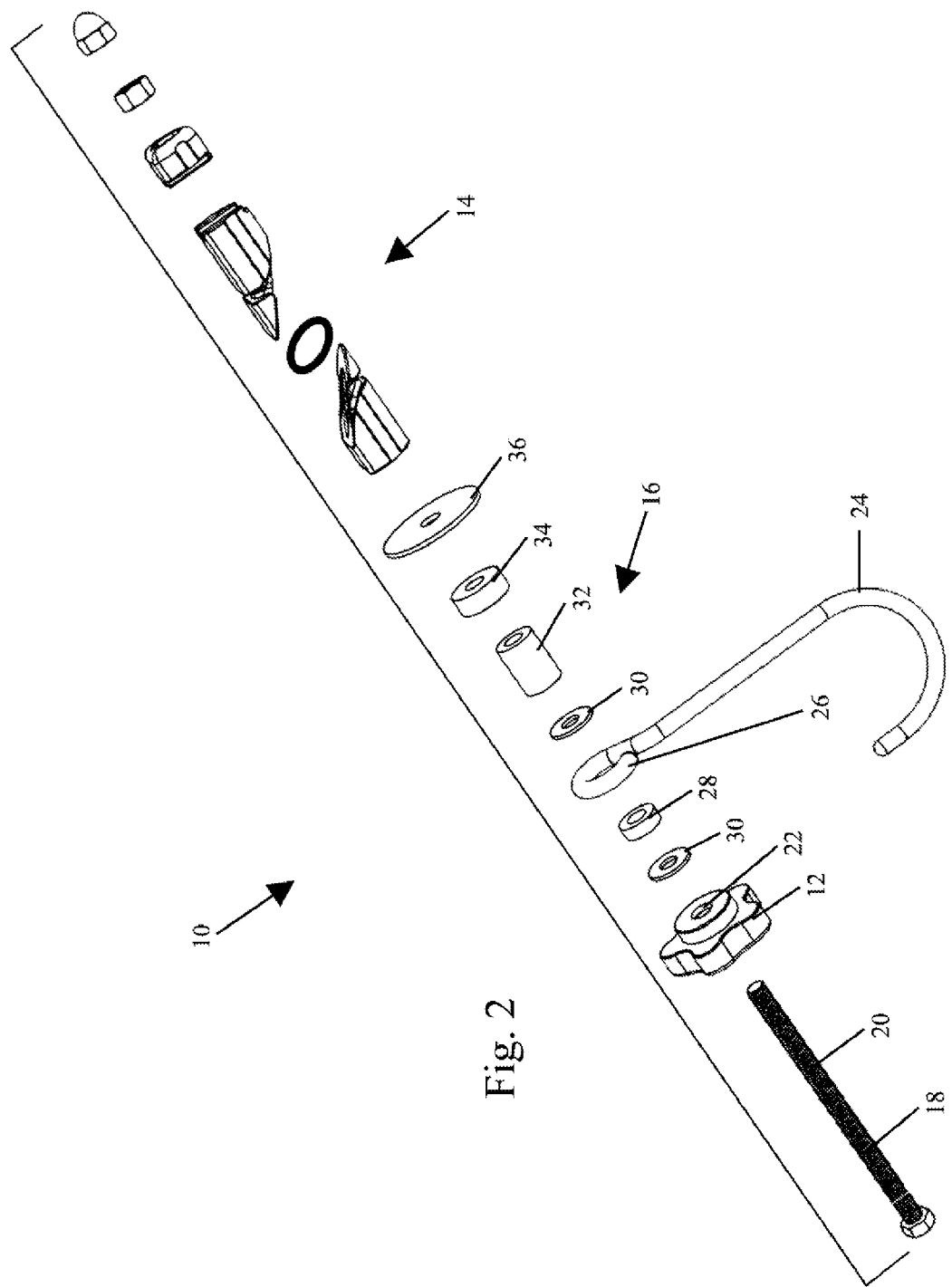

FIG. 2 (Sheet 2) illustrates an exploded side perspective view of an apparatus for hanging or storing tools and equipment on an extension ladder, in accordance with an embodiment of the present disclosure.

Figure 3:
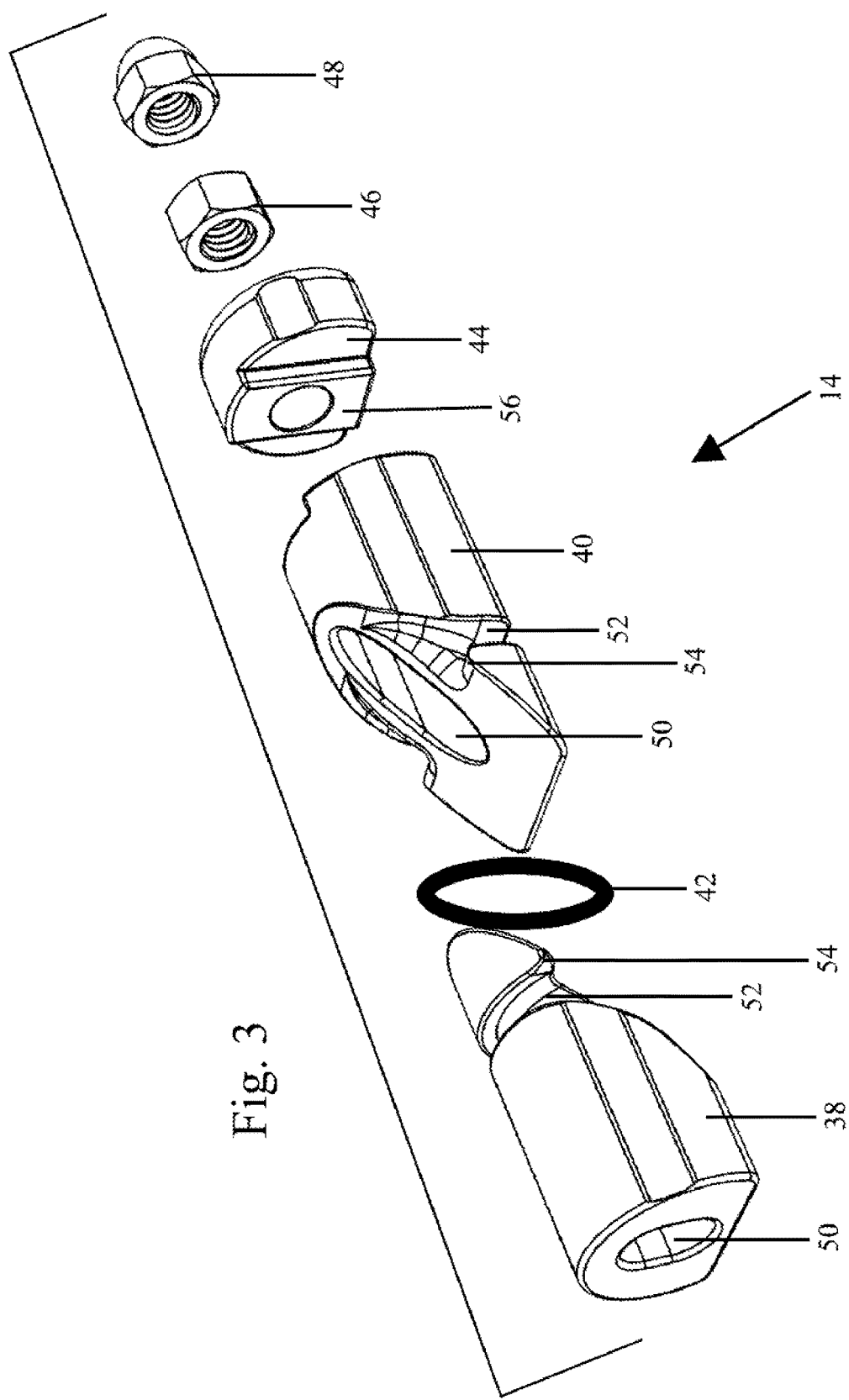

FIG. 3 (Sheet 3) illustrates an exploded side perspective view of an expanding clamping mechanism for an apparatus for hanging or storing tools and equipment on an extension ladder, in accordance with an embodiment of the present disclosure.

Figure 4:
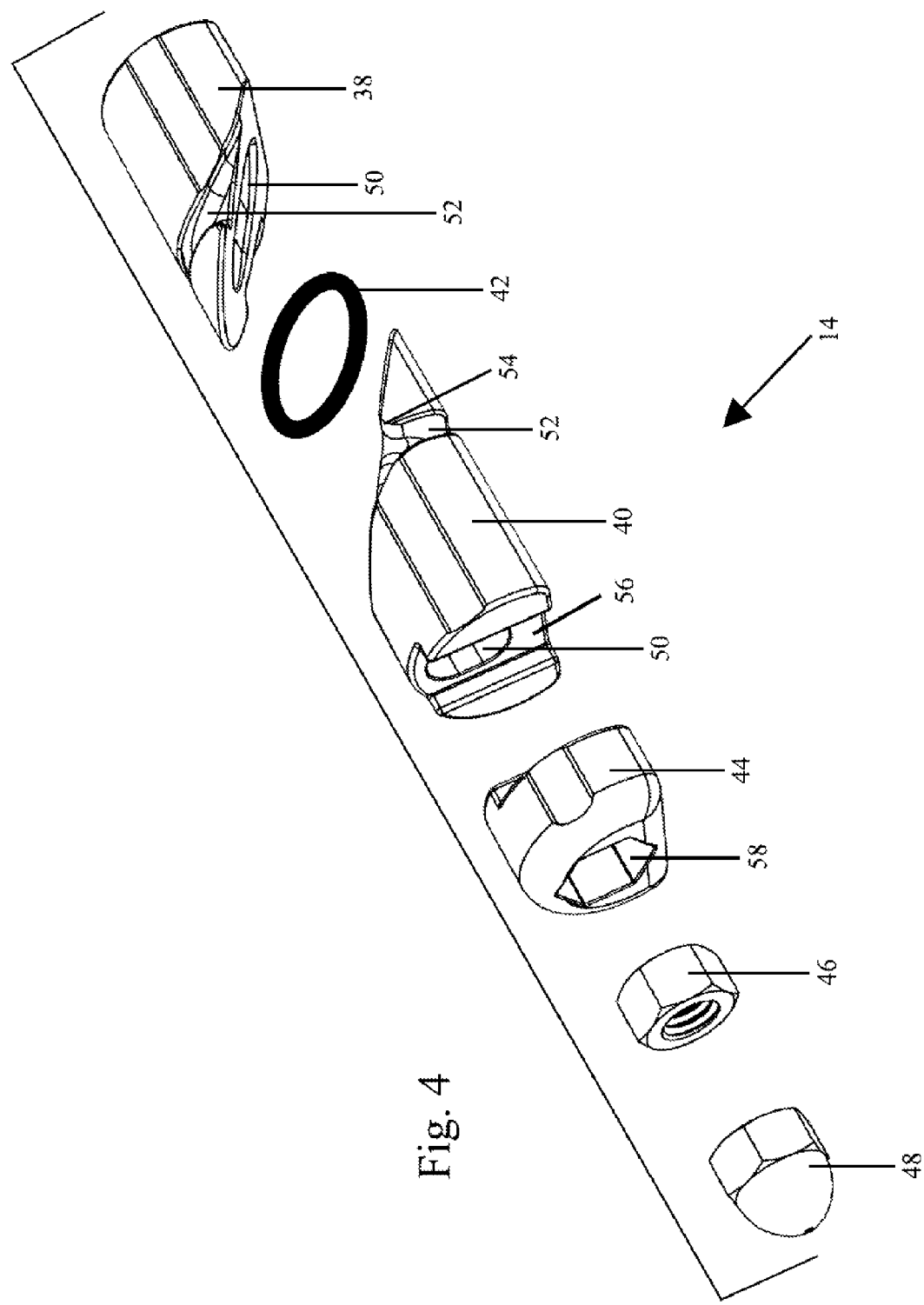

FIG. 4 (Sheet 4) illustrates an exploded side perspective view of an expanding clamping mechanism for an apparatus for hanging or storing tools and equipment on an extension ladder, in accordance with an embodiment of the present disclosure.

Corresponding reference characters indicate corresponding components throughout the several figures of the Drawings. Elements in the several figures are illustrated for simplicity and clarity and have not necessarily been drawn to scale. For example, the dimensions of some of the elements in the figures may be emphasized relative to other elements for facilitating understanding of the various presently disclosed embodiments. Also, common, but well-understood elements that are useful or necessary in a commercially feasible embodiment are often not depicted in order to facilitate a less obstructed view of these various embodiments of the present disclosure.

2. REFERENCES

10 Apparatus for hanging or storing tools and equipment on an extension ladder
12 Handle
14 Expanding clamp mechanism
16 Feature for attachment of tools and equipment
18 Bolt
20 Threads on central bolt
22 Interior threaded channel on handle
24 Hook
26 Ring at top of hook
28 Spacer
30 Washer/s
32 Additional spacer
34 Variably sized spacer
36 Slide Guard
38 First wedge
40 Second wedge
42 Compression belt
44 Shaped nut
46 Nut
48 Acorn Nut
50 Offset slotted center holes
52 Grooves
54 Rounded edges
56 Interlocking reciprocal groves
58 Slot for a nut

DETAILED DESCRIPTION

The following description is not to be taken in a limiting sense, but is made merely for the purpose of describing the general principles of exemplary embodiments, many additional embodiments of this invention are possible. It is understood that no limitation of the scope of the invention is thereby intended. The scope of the disclosure should be determined with reference to the Claims. Reference throughout this specification to "one embodiment," "an embodiment," or similar language means that a particular feature, structure, or characteristic that is described in connection with the embodiment is included in at least one embodiment of the present disclosure. Thus, appearances of the phrases "in one embodiment," "in an embodiment," and similar language throughout this specification may, but do not necessarily, all refer to the same embodiment.

Further, the described features, structures, or characteristics of the present disclosure may be combined in any suitable manner in one or more embodiments. In the Detailed Description, numerous specific details are provided for a thorough understanding of embodiments of the disclosure. One skilled in the relevant art will recognize, however, that the embodiments of the present disclosure can be practiced without one or more of the specific details, or with other methods, components, materials, and so forth. In other instances, well-known structures, materials, or operations are not shown or described in detail to avoid obscuring aspects of the present disclosure. Any alterations and further modifications in the illustrated devices, and such further application of the principles of the invention as illustrated herein are contemplated as would normally occur to one skilled in the art to which the invention relates.

Unless otherwise indicated, the drawings are intended to be read (e.g., arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate. Also, as used herein, terms such as "positioned on" or "supported on" mean positioned or supported on but not necessarily in direct contact with the surface.

The phrases "at least one," "one or more," and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. The terms "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

Further, all numbers expressing dimensions, physical characteristics, and so forth, used in the specification and claims are to be understood as being modified in all instances by the term "about". Accordingly, unless indicated to the contrary, the numerical values set forth in the following specification and claims can vary depending upon the desired properties sought to be obtained by the practice of the invention.

For the purposes of promoting an understanding of the principles of the present invention, reference will now be made to the embodiments illustrated in the drawings and specific language will be used to describe the same. Generally though, this description is of an apparatus for hanging or storing tools and equipment on an extension ladder which uses circular cranking mechanism to cause two or more planes to slide against each other and pressure fit inside the rung of a ladder.

Looking now at the embodiment illustrated in the side perspective view of FIG. 1 we can see an apparatus for hanging or storing tools and equipment on an extension ladder 10. The apparatus 10 has a handle 12 for tightening an expanding clamp mechanism 14, which slides from the side of a ladder into the empty space within the rung of the ladder and expands to removably attach the apparatus 10 to the ladder. Once the apparatus is attached the user of the ladder will be able to use the feature for attachment of tools and equipment 16, provided for by the apparatus 10 to removably attach and store various tools and equipment.

As illustrated in FIG. 1 the handle 12 can be a knob, however the handle may have many designs so long as it effectively applies force to at least one side of the expanding clamp mechanism 14. As illustrated in FIG. 2 the apparatus 9 has a central bolt 18 that runs through the elongate axis of the apparatus. When the handle 12 exerts force on the central bolt 18 it activates the expanding clamp mechanism 14. In the present embodiment the handle is a knob with a threaded interior channel 22 that couples with threads along the central bolt 20 thereby squeezing the expanding clamp mechanism 14 together causing it securely and removably attach itself inside the rung of a ladder. The handle 12 may also be either temporarily or permanently attached to one end of the bolt. In other embodiments the handle can squeeze the expanding clamping mechanism together in other ways. For example, the handle 12 could have a ratcheting cam lever on it that works like the quick grip trigger on a mini bar clamp for fast contraction of the expanding clamping mechanism, possibly also with a quick release trigger. The handle 12 could also be an elongate knob, push button, hinge, hook type handle, or any other mechanism known in the art for effectively applying force on a bolt 18.

As seen in FIGS. 1 and 2, this embodiment comprises a bolt 18 which may extend through the entire apparatus 10. The bolt may or may not have threads 20 on it so long as it allows the handle to exert force from one end of the apparatus to the other, thereby compacting the expanding clamp mechanism along the elongate axis of the apparatus 10. The bolt may be of any length or thickness and be made of any suitably durable material. The bolt may have a permanently attached head, which may be hexagonal.

FIGS. 1 and 2 both illustrate one embodiment of a feature for attachment of tools and equipment 16. The feature illustrated is hook 24. In FIG. 2 you can see that the hook 24 has a ring 26 at its top. The ring 26 may be large enough to have a spacer 28 fit inside it, on either side of the ring 26, and spacer 28 may be washers 30 and additional spacers 32 and/or spacers of various sizes 34; all of these have central holes through which the bolt 18 may pass. The spacers and washers allow the hook 24 or other feature for attachment of tools and equipment 16 swing freely and not be bound in their position by the force placed on the spacers and washers by the handle 12. The number of spacers and washers may be adjusted in order to accommodate different features for the attachment of tools and equipment or simply to accommodate the use of longer bolts 12.

In various embodiments different features for attachment 16 may be added or removed from the apparatus 10 in order to accommodate the needs of the user. Some examples of features for attachment of tools and equipment include: connections, accessories, tool holders, platforms, racks, rings, buckets, boxes, compartments, containers, pouches, holsters, pulleys, lanyards, loops, anchors, magnets, cups, buckets, ties, ropes, strings, clips, snaps, notches, Velcro, or any other feature for attachment. In this embodiment a slide guard 36 prevents the area for the features for the attachment of tools and equipment 16 from being inserted into the rung of the ladder with the expanding clamp mechanism 14.

FIGS. 3 and 4 illustrate a preferred embodiment of an expanding clamp mechanism 14. The expanding clamp mechanism 14 comprises one or more of the following: a first wedge 38, a second wedge 40, and a compression belt 42. The expanding clamp mechanism 14 may additionally comprise one or more of the following: a shaped nut 44, a nut 46, and/or an acorn nut 48. In this preferred embodiment of the expanding clamp mechanism 14 the cross-section is shaped like a capital D having a flat surface corresponding to the top of the rung of a ladder which is typically flat to accommodate the user's feet and a curved section to correspond to the standard curved lower portion of the rung of an industrial ladder. The shape of the expanding clamp mechanism 14 corresponds to the interior dimensions of the rung into which it is inserted. In various other embodiments the cross-section of the expanding clamp mechanism 14 can be circular, square or whatever shape is necessary to correspond to the interior of the rung of the ladder such that it can slide in and out of the rung easily and clamp securely within.

FIGS. 3 and 4, illustrate an embodiment with two wedges: a first wedge 38 and a second wedge 40. Each wedge has at least one surface disposed toward the other at an angle such that when they are pressed together along the axis of the bolt 18 they slide against each other moving radially from the elongate axis of the bolt 18. This motion then forces the wedges into the sides of the interior of the rung of a ladder causing a compressive force that firmly locks the apparatus into the ladder rung.

To facilitate the radial movement of the wedges along the bolt 18 the wedges have offset slotted center holes 50 that allow for radial movement. When removing the expanding clamp mechanism 14 from the ladder rung compression of the wedges toward the bolt is desired. One or more compression belts 42 may accomplish this by pulling the wedges back toward the bolt. A compression belt 42 is made of an elastic material such as rubber; goes around the wedges; and may be a sleeve, band, or ring. The compression belt may be of various thicknesses, lengths, and widths so long as it pulls the wedges back toward the bolt and allows the apparatus to easily be removed from the ladder rung. In a preferred embodiment the compression belt 42 is an O-ring. To facilitate the use of a compression belt the wedges may have grooves 52 along their sides for the compression belt to fit into so that it does not stand proud of the wedges. The grooves may be tapered and curved 54 where they come to points along the sides of the wedge so that they do not accidentally pinch or break the compression belt.

While the compressive forces on one side of the wedges may come directly from the slide guard 36 or a washer 30 the compressive forces on the other side may come from a variety of sources such as a washer, nut, or the end of the bolt may simply have a stamped or flanged end. In a preferred embodiment the compressive forces come from a shaped nut 44. The shaped nut 44 can be of the same cross-sectional shape as the expanding clamp mechanism 14 or another useful shape. The shaped nut 44 and the wedge with which it touches may have interlocking reciprocal groves 56 which facilitate expansion of the clamp in the desired orientation. In the illustrated embodiment the orientation of the clamp expansion would be up and down.

As seen in FIG. 4 the shaped nut 44 may also have a slot for a nut 58 on its distal end for receiving and securely housing a nut 46 thereby causing it to stay in the housing and cause the shaped nut 44 to work as a compression counter point for the bolt allowing the handle to exert force on both ends of the wedges. This preferred configuration allows for a fixed handle 12 on the bolt 18 and an open ended distal end of the bolt for removal of all the elements of the apparatus 10 for reconfiguration should different features for attachment of tools and equipment 16 be desired. In this configuration an acorn nut 48 may be used to close off the end of the bolt and prevent any accidental detachment of the elements of the apparatus 10.

Advantages of this apparatus include an extremely tight attachment to the interior of a ladder rung accomplished by a large area of surface contact with strong compressive forces holding the expanding clamp within the rung. The apparatus slides in and out easily and can be configured in an almost infinite number of ways as desired by the user for length and features for attachment of tools and equipment. The apparatus also uses many off the shelf and easily obtainable components making repair and modification convenient for the user.

Information as herein shown and described in detail is fully capable of attaining the above-described object of the present disclosure, the presently preferred embodiment of the present disclosure; and is, thus, representative of the subject matter; which is broadly contemplated by the present disclosure. The scope of the present disclosure fully encompasses other embodiments which may become obvious to those skilled in the art, and is to be limited, accordingly, by nothing other than the appended claims, wherein any reference to an element being made in the singular is not intended to mean "one and only one" unless explicitly so stated, but rather "one or more." All structural and functional equivalents to the elements of the above described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for such to be encompassed by the present claims. Furthermore, no element, component, or method step in the present disclosure is intended to be dedicated to the public regardless of whether the element, component, or method step is explicitly recited in the claims. However, that various changes and modifications in form, material, work-piece, and fabrication material detail may be made, without departing from the spirit and scope of the present disclosure, as set forth in the appended claims, as may be apparent to those of ordinary skill in the art, are also encompassed by the present disclosure.

What is claimed is:

1. An apparatus for hanging or storing tools and equipment on an extension ladder, comprising:
   a handle;
   a bolt;
   a feature for attachment of tools and equipment;
   two or more wedges facing each other; and
   an elastic belt;
   wherein said bolt extends through said feature for attachment of tools and equipment, through said two or more wedges, and through said elastic belt; wherein said bolt has a compression counter point at its distal end from said handle and said handle can be used to cause compression of at least one surface of each wedge disposed toward the other at an angle such that when they are pressed together along an elongate axis of the bolt they slide against each other moving radially from said elongate axis of the bolt such that the apparatus can expand to clamp itself within a hollow rung of a ladder; and wherein said elastic belt causes said wedges to contract radially when said compression caused by said handle is removed.

2. The apparatus of claim 1, wherein said wedges further comprise offset slotted center holes.

3. The apparatus of claim 1, wherein said wedges further comprise grooves along their sides for said elastic belt to fit into.

4. The apparatus of claim 3, wherein said grooves are tapered or curved where they come to points along the sides of said wedges.

5. The apparatus of claim 1, wherein said elastic belt is a sleeve.

6. The apparatus of claim 1, wherein said elastic belt is an O-ring.

7. The apparatus of claim 1, further comprising a shaped nut at the end of said bolt distal from the handle.

8. The apparatus of claim 7, wherein said shaped nut and one or more of said wedges have interlocking reciprocal groves.

9. The apparatus of claim 7, wherein said shaped nut has a slot to secure a nut.

10. The apparatus of claim 1, wherein said handle and said bolt are permanently connected.

11. The apparatus of claim 1, wherein a cross-section of said wedges is shaped like a capital D.

12. The apparatus of claim 1, wherein said feature for attachment of tools and equipment comprises a hook.

13. The apparatus of claim 1, further comprising an acorn nut.

14. The apparatus of claim 1, further comprising spacers and washers through which the bolt passes.

15. The apparatus of claim 1, further comprising a slide guard through which the bolt passes.

16. An apparatus for hanging or storing tools and equipment on an extension ladder, comprising:
  a handle;
  a bolt;
  a feature for attachment of tools and equipment;
  two or more wedges facing each other wherein said wedges further comprise offset slotted center holes and grooves along their sides for an elastic belt to fit into, wherein said grooves are tapered or curved where they come to points along the sides of said wedges;
  an elastic belt; and
  a shaped nut, wherein said shaped nut and one or more of said wedges have interlocking reciprocal groves and said shaped nut has a slot for securing a nut; wherein said bolt extends through said feature for attachment of tools and equipment, through said two or more wedges, and through said elastic belt; wherein said bolt has a compression counter point at its distal end from said handle and said handle can be used to cause compression of at least one surface of each wedge disposed toward the other at an angle such that when they are pressed together along an elongate axis of the bolt they slide against each other moving radially from said elongate axis of the bolt such that the apparatus can expand to clamp itself within a hollow rung of a ladder; and wherein said elastic belt causes said wedges to contract radially when said compression caused by said handle is removed.

* * * * *